United States Patent
Gouws et al.

(10) Patent No.: US 11,481,391 B1
(45) Date of Patent: Oct. 25, 2022

(54) QUERY LANGUAGE OPERATIONS USING A SCALABLE KEY-ITEM DATA STORE

(71) Applicant: Amazon Technologies, Inc., Seattle, WA (US)

(72) Inventors: Almero Gouws, Seattle, WA (US); Derek William Richard Chen-Becker, Centennial, CO (US); Akshat Vig, Seattle, WA (US); Haifeng He, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/694,945

(22) Filed: Nov. 25, 2019

(51) Int. Cl.
  *G06F 16/2453* (2019.01)
  *G06F 16/22* (2019.01)
  *G06F 16/2458* (2019.01)

(52) U.S. Cl.
  CPC ...... *G06F 16/2453* (2019.01); *G06F 16/2282* (2019.01); *G06F 16/2471* (2019.01)

(58) Field of Classification Search
  CPC ............. G06F 16/2453; G06F 16/2471; G06F 16/2282
  See application file for complete search history.

(56) References Cited

U.S. PATENT DOCUMENTS

| | | | |
|---|---|---|---|
| 2010/0106934 A1* | 4/2010 | Calder | G06F 3/0605 711/173 |
| 2016/0026667 A1* | 1/2016 | Mukherjee | G06F 3/0679 707/714 |
| 2016/0350375 A1* | 12/2016 | Das | G06F 16/2456 |
| 2017/0031988 A1* | 2/2017 | Sun | G06F 16/24554 |
| 2017/0193041 A1* | 7/2017 | Fuchs | G06F 16/2453 |
| 2019/0087457 A1* | 3/2019 | Bellamkonda | G06F 16/24553 |
| 2019/0325052 A1* | 10/2019 | Bastawala | G06F 12/0891 |
| 2019/0370372 A1* | 12/2019 | Lam | G06F 16/2282 |
| 2020/0218717 A1* | 7/2020 | Sharma | G06F 16/24578 |
| 2020/0250190 A1* | 8/2020 | Yang | G06F 16/221 |
| 2020/0320051 A1* | 10/2020 | Lee | G06F 16/2228 |

* cited by examiner

*Primary Examiner* — Dangelino N Gortayo
(74) *Attorney, Agent, or Firm* — Davis Wright Tremaine LLP (57) ABSTRACT

A distributed database system maintains data for a logical table by storing, on a plurality of storage nodes, a collection of key-item pairs. The distributed database system receives a query of the logical table, and identifies one or more portions of a key specified by the query. Based on the one or more portions of the key, the distributed database causes at least one of a get, range query, or scan operation to be performed by one or more of the storage nodes. Results for the query are generated based on one or more items obtained by performance of the operation.

20 Claims, 9 Drawing Sheets

QUERY LANGUAGE OPERATIONS USING A SCALABLE KEY-ITEM DATA STORE

BACKGROUND

Distributed database systems may be called upon to provide scalable and reliable access to data. In some distributed database systems, the system maintains data on a cluster of servers and replicates data between the servers. In some cases, the servers may each operate as independent entities, and no one server is considered to be the master. A distributed database system employing this approach may provide increased scalability and reliability compared to some systems. However, further improvements to scalability and reliability may be made. Support for multitenancy in such systems may also be improved.

BRIEF DESCRIPTION OF THE DRAWINGS

Various techniques will be described with reference to the drawings, in which.

DETAILED DESCRIPTION

In an example of a distributed database system described in more detail herein, a distributed database system processes a table-oriented or relational database query that is directed to a logical table. A query processing subsystem translates the table-oriented, or relational, query to one or more operations suitable for performance by a storage subsystem which implements scalable, distributed storage using a key-item storage paradigm. The logical table may be described as comprising logical rows, and the underlying data for each row stored as an item in a collection of key-item pairs maintained by the storage subsystem.

Depending upon the attributes of the query, the query processing subsystem translates the query into one or more get, range query, or scan operations, as described in more detail herein. In particular, the query processing subsystem may translate the query to a get operation when the query provides key information to locate the storage node on which a particular item is stored, and sufficient key information to locate the item on that storage node. The query processing subsystem may translate the query to a range query operation when the query provides key information sufficient for utilizing a local index of items on a storage node. The query processing subsystem may translate the query to a scan operation when a get or range query operation would be insufficient to locate data for each of the logical rows specified by the query.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including those related to the storage and retrieval of configuration information. In particular, the technical field of computing configuration management is improved by the provision of techniques, embodiments of which are described herein, for indexing configuration data and facilitating the efficient retrieval of configuration data.

Figure 1:
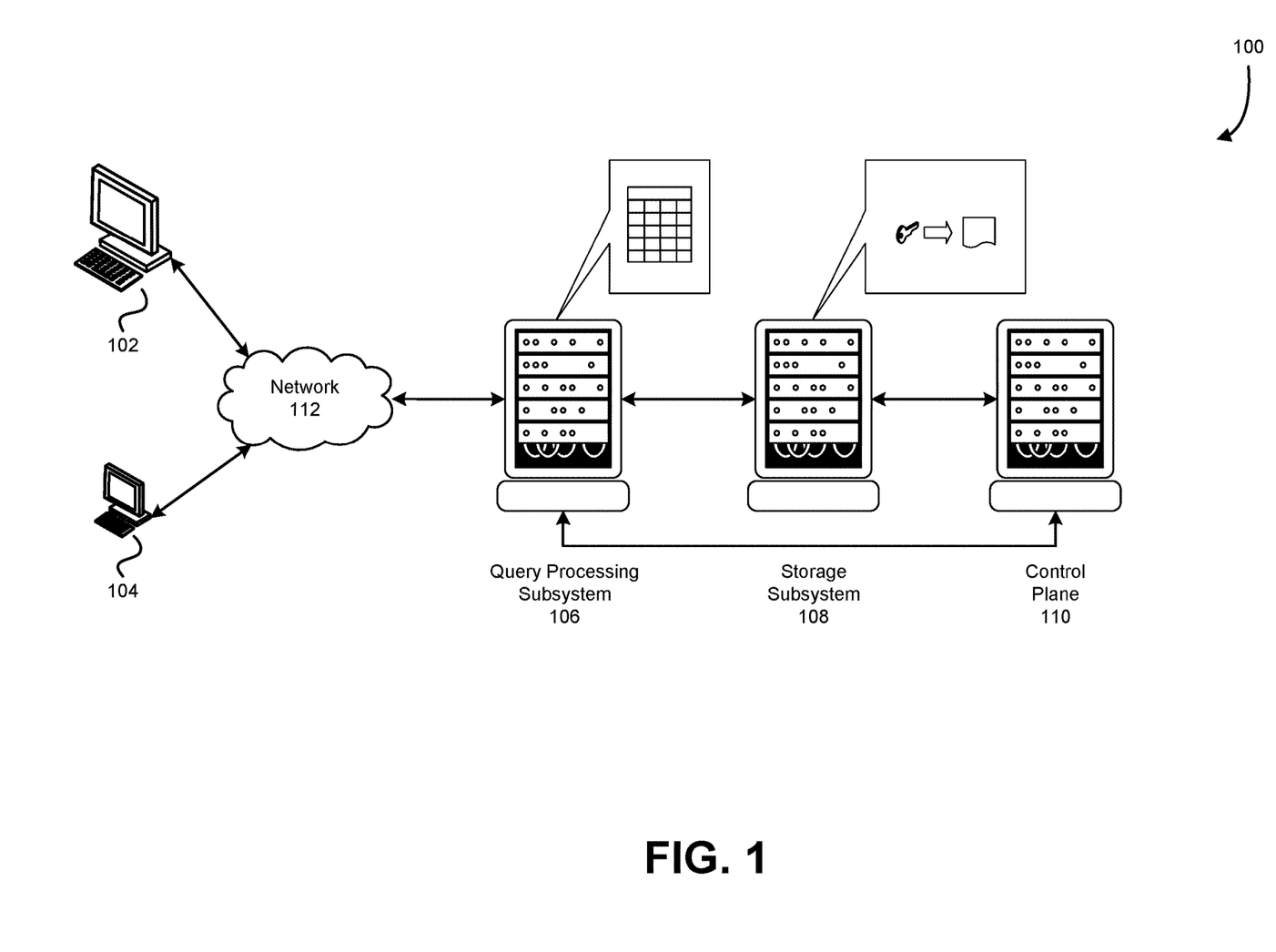
FIG. 1 illustrates an example distributed database system, in accordance with at least one embodiment.

FIG. 1 illustrates an example distributed database system, in accordance with at least one embodiment. In the example of FIG. 1, a distributed database system 100 is a multi-tenant database system, capable of storing data on behalf of a plurality of clients 102, 104. The distributed database system 100 may be described as multi-tenant because data maintained by the system 100 on behalf of one client 102 is not generally visible to another client 104.

In the example of FIG. 1, the distributed database system 100 comprises a query processing subsystem 106, storage subsystem 108, and control plane 110.

A client 102, 104 may comprise a computing device, computing process, hosted computing service, and so forth. A client, as used herein, generally refers to a client device associated with a particular entity, such as a customer of a hosted distributed database service.

In at least one embodiment of the depicted system 100, interaction between a client 102, 104 and the distributed database system 100 is performed using an interaction protocol that defines a format for exchanging messages between a client 102, 104 and the distributed database system 100. A client 102, 104 may comprise a driver module, or other software, that implements an interaction protocol. Clients 102, 104 may communicate with the distributed database system 100 via a network 112, e.g. by transmitting messages via an interaction protocol to a front-end system, such as to a node or other element of a query processing subsystem 106.

In the example of FIG. 1, query processing subsystem 106 comprises a plurality of front-end nodes, which may also be described as front-end peers, query processing peers, or as peers. In at least one embodiment of the depicted system 100, front-end nodes are added to or removed from the front-end 106 to scale according to demands on capacity or utilization.

In at least one embodiment of the depicted system 100, query processing subsystem 106 provides table-oriented access to data maintained by the distributed database system 100. Table-oriented, or tabular, access refers, in part, to the data being accessed in terms of tables, e.g., as rows and columns of table.

In at least one embodiment of the depicted system 100, query processing subsystem 106 provides access to data specified in terms of a table-oriented query language, such as structured query language ("SQL") or Cassandra query language ("CQL"). In at least one embodiment of the depicted system 100, access to data is table-oriented but non-relational. As such, a query language supported by the query processing subsystem 106 may be a subset of a relational query language, such as SQL.

In at least one embodiment of the depicted system 100, query processing subsystem 106 comprises a query parser and query planner. When a query is received from a client 102, 104, the query parser analyzes the query, identifies the query's constituent keywords and clauses, and determines the query's meaning. The query planner then formulates a plan for executing the query. In at least one embodiment of the depicted system 100, the query processing subsystem 106 then executes the query plan.

In at least one embodiment of the depicted system 100, each node of the query processing subsystem 106 is independently capable of performing the aforementioned functions of the query parser and query planner, and of executing the generated query plan. In at least one embodiment of the depicted system 100, execution of a generated query plan comprises interaction with one or more storage nodes of a storage subsystem 108.

In the example of FIG. 1, storage subsystem 108 comprises a plurality of storage nodes, which may also be describe as storage peers, or as peers. The term peer may also be used to refer to a combination of one or more query processing peers and one or more storage peers.

In at least one embodiment of the depicted system 100, storage nodes are added to or removed from the storage subsystem 108 to scale according to demands on capacity or utilization.

In at least one embodiment of the depicted system 100, the storage subsystem 108 operates as a key-item, non-relational data store. The storage subsystem 108, in at least one embodiment of the depicted distributed database system 100, is a key-item data store having comparatively high scaling properties, but comparatively limited query capabilities. For example, while embodiments of the query processing subsystem 106 may provide support for SQL or CQL queries, embodiments of the storage subsystem may instead support comparatively primitive operations which store and retrieve individual values, or collections of values, based on a key value. The storage subsystem 108 may, in some embodiments, provide limited support for range queries, e.g. by providing for the retrieval of values, or collections of values, associated with a range of key values. In at least one embodiment of the depicted distributed database system 100, these limitations allow the system 100 to be highly scalable, and to facilitate implementation of a range of replication models and approaches to multi-tenancy.

A key-item pair, in at least one embodiment, comprises one or more values which may be collectively referred to as the item in a pair, and an associated key. In another embodiment, the item is a document, or a single value. In still other embodiments, the item is an object, binary data, and so forth.

In at least one embodiment of the depicted system 100, a control plane 110 facilitates scaling the capacity of the query processing subsystem 106. The control plane 110 may, for example, monitor actual or forecast capacity utilization of the query processing subsystem 106 and add or remove query processing nodes accordingly.

In at least one embodiment of the depicted system 100, a control plane 110 facilitates scaling the capacity of the storage subsystem 108. The control plane 110 may, for example, monitor actual or forecast capacity utilization of the storage subsystem 108 and add or remove storage nodes to the subsystem.

In at least one embodiment of the depicted system 100, the control plane 110 facilitates management of capacity utilization by respective clients 102, 104. For example, the control plane 110 may monitor capacity utilization by clients 102, 104 and determine allocations of partitions among storage nodes of the storage subsystem 108. Similarly, the control plane 110 may determine how many and which query processing nodes the clients 102, 104 should have access to.

Figure 2:
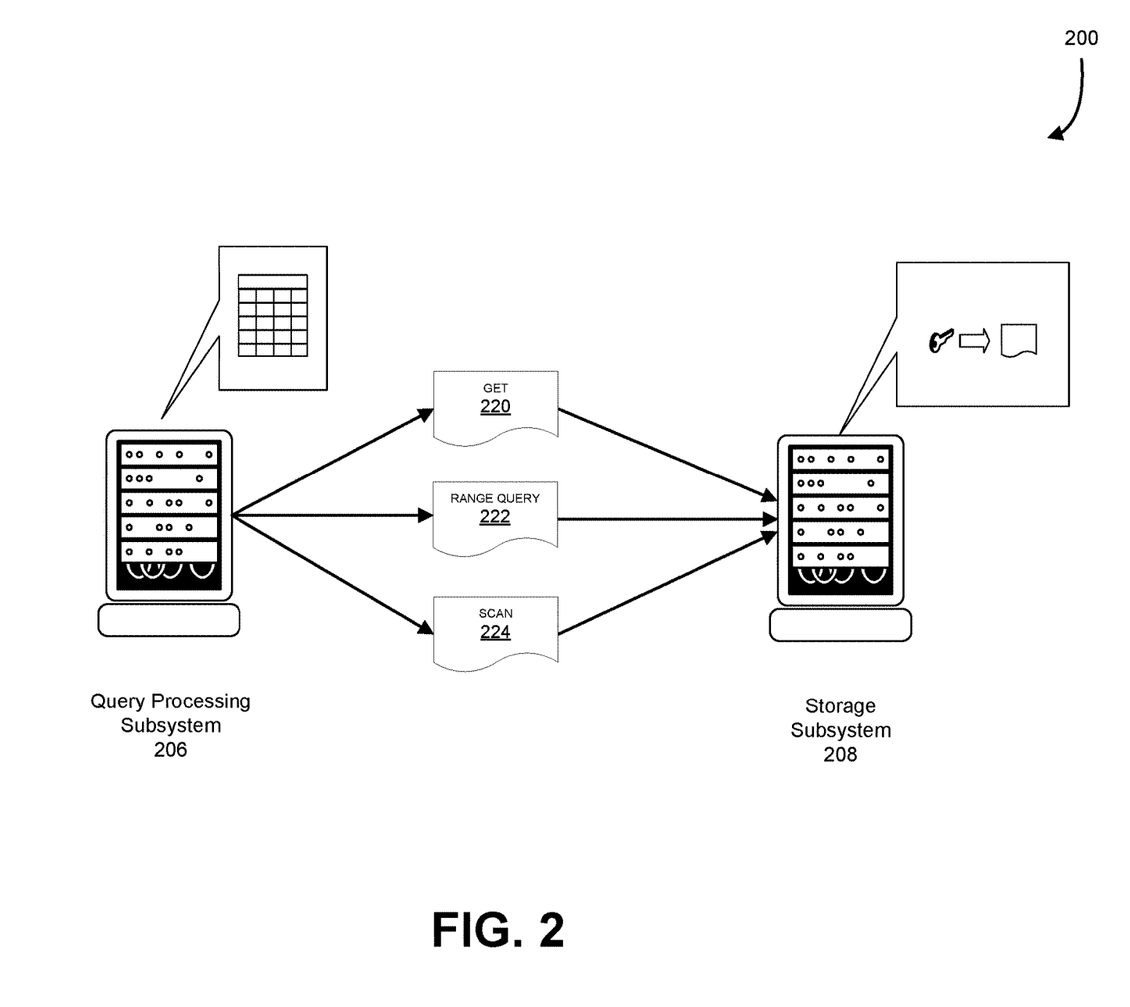
FIG. 2 illustrates an example of processing a query on a storage subsystem maintaining a collection of key-item pairs, in accordance with at least one embodiment.

FIG. 2 illustrates an example of processing a query on a storage subsystem maintaining a collection of key-item pairs, in accordance with at least one embodiment. In FIG. 2, a distributed database 200 comprises a query processing subsystem 206 and storage subsystem 208. The distributed database 200, query processing subsystem 206, and storage subsystem 208 may correspond to the distributed database 100, query processing subsystem 106, and storage subsystem 108 of FIG. 1.

In at least one embodiment, the query processing subsystem 206 receives a table-oriented query. Examples of a table-oriented query include relational database queries, such as those that might be expressed using a query language such as SQL, and table-oriented (but not necessarily relational) query languages, such as CQL. These examples are intended to be illustrative rather than limiting, and as such should not be construed so as to limit the scope of the present disclosure to only those embodiments which include the specific examples provided.

In at least one embodiment, the storage subsystem 208 comprises a plurality of storage nodes, or peers, which collectively maintain a collection of key-item data on behalf of a client, such as one of the clients 102, 104 depicted in FIG. 1. The distributed database 200 may be a multi-tenant system, on which data is maintained for a plurality of clients. The storage nodes of the storage subsystem may each maintain a portion of data on behalf of a single client, or on behalf of multiple clients. A subset of the storage nodes may be associated with the maintenance of a particular client's data, or a particular collection of key-item pairs.

The collection of key-item pairs maintained by the storage subsystem 208, in at least one embodiment, comprises items which correspond to rows of a table. The table may, for example, be a table that is the subject of a database query to be processed by the distributed database 200.

The storage subsystem 208, in at least one embodiment, has increased scalability compared to some other storage technologies, such as those specifically designed for relational or table-oriented databases.

In at least one embodiment, the query processing subsystem 206 receives a query directed to a table. Data for the table is maintained by the storage subsystem 208 as a collection of key-item pairs, in which each item may correspond to a row of the table. In at least one embodiment, each item corresponds to a subset of a row, such as a cell (e.g., the intersection of a row and column).

In at least one embodiment, the query processing subsystem 206 analyzes the received query to determine the extent to which the query specifies rows to include in the results of the query. These rows may be described as rows that are the subject of the query.

In some cases, the query might precisely describe the subject rows, and indicate where those rows reside. For example, the query might precisely identify a subject row by including, in the query, the row's primary key. The query might also contain enough information to indicate precisely which storage node, of the storage subsystem 208, the subject row is stored on. In such cases, in at least one embodiment, the query processing subsystem 206 retrieves the subject row's data from the storage subsystem 208 by performing a GET 220 operation. The GET operation, in at least one embodiment, is an operation for returning an item based on a fully specified key.

In other cases, the query might contain enough information to indicate precisely which storage node, of the storage subsystem 208, maintains data for the rows that are the target of the query. The query processing subsystem 206 may retrieve the data by performing a RANGE QUERY 222 operation on a node of the storage subsystem 208. For example, the RANGE QUERY 222 operation may examine an index of the storage node to identify and retrieve data for the subject rows.

In still other cases, the query might not contain enough information to indicate precisely which storage nodes maintain data for the subject rows. The query processing subsystem 206 may, in such cases, retrieve the data by performing a SCAN operation 224 on a plurality of storage nodes of the storage subsystem 208. These storage nodes may include each of those associated with maintaining the subject table's data.

In at least one embodiment, the query processing subsystem 206 causes one or more storage nodes of the storage subsystem 208 to perform GET, RANGE QUERY, or SCAN operations, and then uses the data returned from these operations to generate results for the received query. The GET, RANGE QUERY, and SCAN operations are described in more detail herein, particular with respect to FIGS. 4-6.

Figure 3:
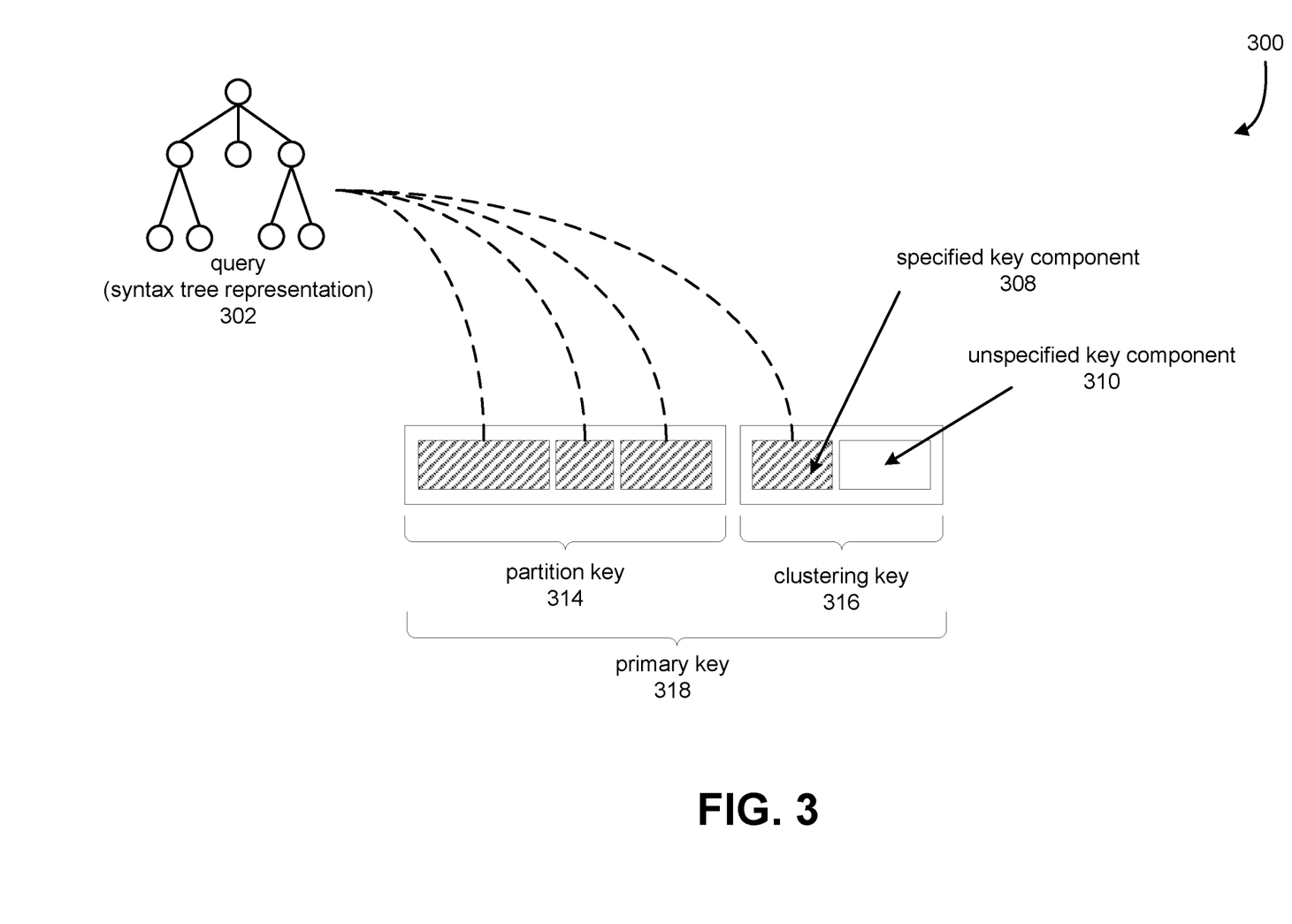
FIG. 3 illustrates an example of identifying portions of a partition key and clustering key indicated by a query, in accordance with at least one embodiment.

The query processing subsystem 206, in at least one embodiment, identifies the portions of partition and clustering keys that are specified by a query. FIG. 3 illustrates an example of identifying portions of a partition key and clustering key indicated by a query, in accordance with at least one embodiment.

In the example 300 of FIG. 3, a received query—such as the received query discussed in relation to FIG. 2, is parsed to generate a syntax tree representation 302 of a query. In at least one embodiment, the syntax tree representation 302 is generated by parsing a received query. Lexical analysis of the received query, based on the syntax tree, can result in identification of various query clauses which restrict the result set of the query to certain rows. For example, the query SELECT*FROM t WHERE pk=123 restricts the results of the query to the one row whose primary key ("pk" this example) is equal to 123. Similarly, the query SELECT*FROM t WHERE c1>5 restricts the results of the query to those rows whose value for c1 is greater than 5.

As depicted in the example 300 of FIG. 3, analysis of the received query may determine that certain key components 308 are specified by the query, and determine that other key components 310 are unspecified by the query.

In at least one embodiment, a table of data is associated with a partition key 314 and a clustering key 316.

In at least one embodiment, a partition key 314 is used to identify a logical partition in which a row of the table is stored. A partition key, such as the partition key 314 depicted in FIG. 3, is made up of one or more portions, each of which may correspond to a column of the row. Note that these individual portions may also be referred to as partition keys, and the portions combined referred to as a compound partition key. However, as used herein, a partition key can include cases in which a single column makes up the partition key, and cases in which multiple columns make up the partition key.

In at least one embodiment, a partition key identifies the logical partition in which a row of a table is stored.

In at least one embodiment, a partition key, or compound partition key, identifies a storage node on which data for a row of a table is stored. A query processing subsystem, such as the query processing subsystems depicted in FIGS. 1 and 2, may determine where to retrieve data from based on how the partition key is specified in the query 302.

A clustering key 316, in at least one embodiment, defines columns used to define a sort order of an index. A clustering key, which may sometimes be referred to as a compound clustering key, is made up of one or more portions, each of which may correspond to a column of a table, and which, depending on context, may also be referred to as a clustering key.

In at least one embodiment, the sort order defined by clustering key 316 is used to generate an index. The index is sorted according to the clustering key 316 and is scoped to a storage node to which the index pertains. These are sometimes referred to as local indexes, local secondary indexes, and so forth.

In at least one embodiment, portions of a clustering key 316 are specified by a query 302 and used, by a query processing subsystem, to retrieve data. In particular, the query processor analyzes the specified portions of the clustering key to determine what types of operations may be performed on storage nodes to retrieve data. For example, if a clustering key is specified completely by the query 302, or if a contiguous prefix of the clustering key is specified, then the query processing subsystem may determine to perform a RANGE QUERY operation in lieu of a SCAN operation.

As noted, certain portions of the partition key 314 and clustering key 316 may be specified by a query, and certain portions may be unspecified.

In one case, no portion of a partition key 314 or clustering key 316 is specified by a query 302. In such cases, the query processing subsystem may determine to perform a SCAN operation on each storage node associated with the subject table.

In another case, the partition key 314 is partially specified by the query, and no portion of the clustering key 316 is specified. Here, the incomplete specification of the partition key 314 may be insufficient to identify a particular storage node on which the subject row or rows may are stored. As such, the query processing subsystem may determine to perform a SCAN operation on each storage node associated with the subject table. In at least one embodiment, a storage node containing a subject row or rows is not identifiable unless the partition key is partially specified.

In another case, the partition key 314 is fully specified by the query, and no portion of the clustering key is specified. Here, the query processing subsystem may identify the particular storage node on which the subject row, or rows, are held. If the query specifies a complete primary key 318, the query processing subsystem may specify a GET operation. Otherwise a RANGE QUERY or SCAN may be performed, confined to the identified storage node.

In another case, the clustering key 316 is partially specified and the specified portions constitute a contiguous prefix of the clustering key. In such cases, a RANGE QUERY can be performed, based on the index associated with the clustering key. In at least one embodiment, the RANGE QUERY is performed on a storage node identified based on a completely specified partition key 314.

In another case, the clustering key 316 is partially specified and the specified portions do not constitute a contiguous prefix of the clustering key. In at least one embodiment, a SCAN is performed. In at least one embodiment, the SCAN is performed on a storage node identified based on a completely specified partition key 314.

Figure 4:
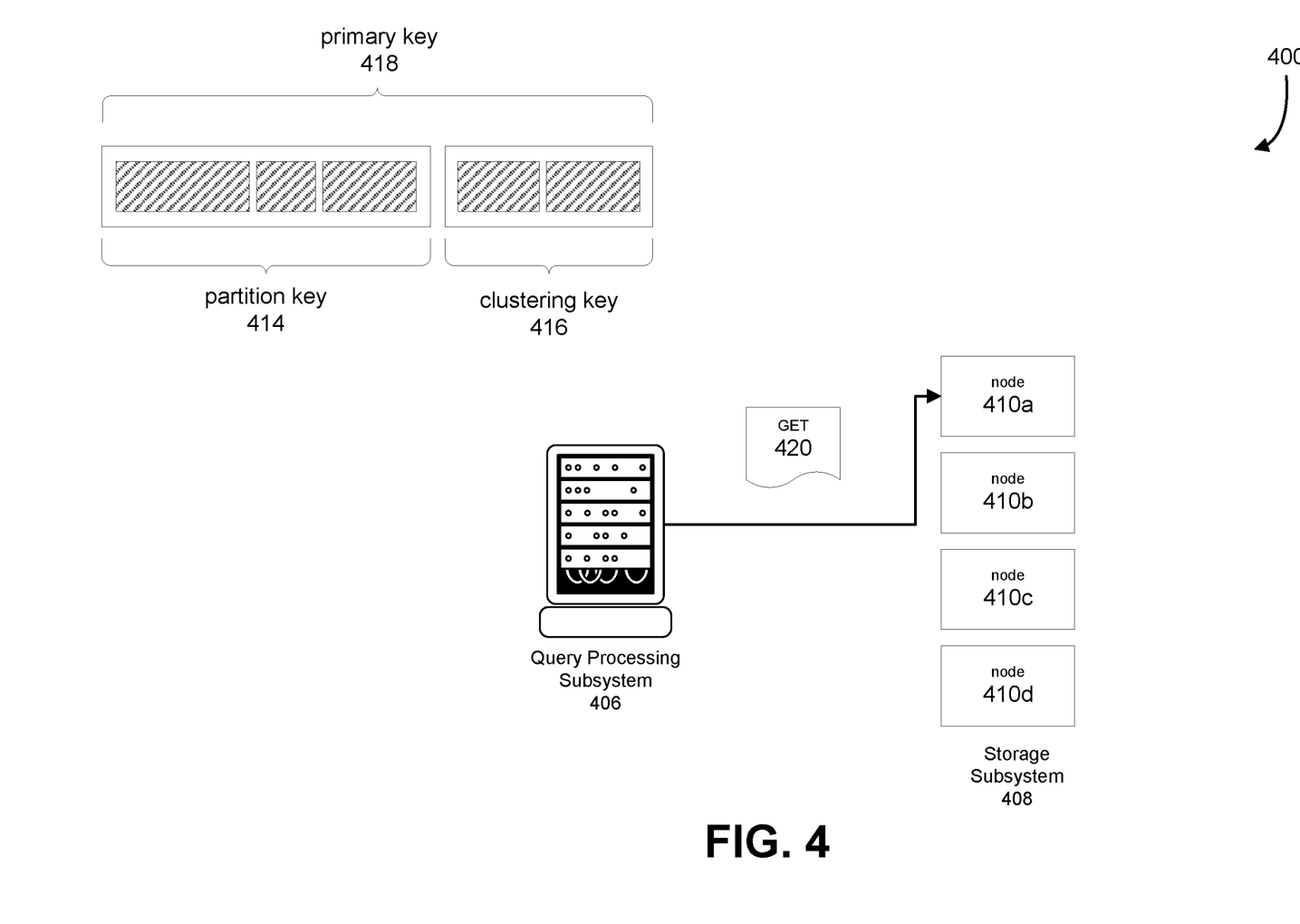
FIG. 4 illustrates an example of executing a table-oriented query using a GET operation, in accordance with at least one embodiment.

FIG. 4 illustrates an example of executing a table-oriented query using a GET operation, in accordance with at least one embodiment. In this example 400, a query, such as the one depicted in FIG. 3, fully specifies a partition key 414. For the purposes of this example, the query may or may not indicate portions of a clustering key 416.

For example, a row of a table t1 might, for purposes of the example, be considered to have columns c1, c2, c3, c4, and c5 where the partition key 414 comprises columns c1, c2, and c3, and the clustering key comprises c4 and c5. The partition key 414 and clustering key 416 together comprise a primary key of a row. For the purposes of the example, it might also be considered that the row [c1=v, c2=w, c3=x, c4=y, c5=z] is stored on a particular node 410a of the nodes 410a-d storage subsystem 408. If a query SELECT*FROM t1 WHERE c1=v, c2=w, c3=x, c4=y AND c5=z is issued, the partition key 414, clustering key 416, and primary key 418 are fully specified. The query processing subsystem 406, in response to determining that the partition key 414, clustering key 416, and primary key 418 are fully specified, may cause a GET operation 420 to be performed by the storage subsystem. The GET operation may comprise locating the storage node based on the partition key 414, and retrieving the particular item based on the primary key 418. An item corresponding to this primary key may then be returned by the storage subsystem to the query processing subsystem 406. The query processing subsystem 406 may then incorporate the retrieved item into the results of the query.

Figure 5:
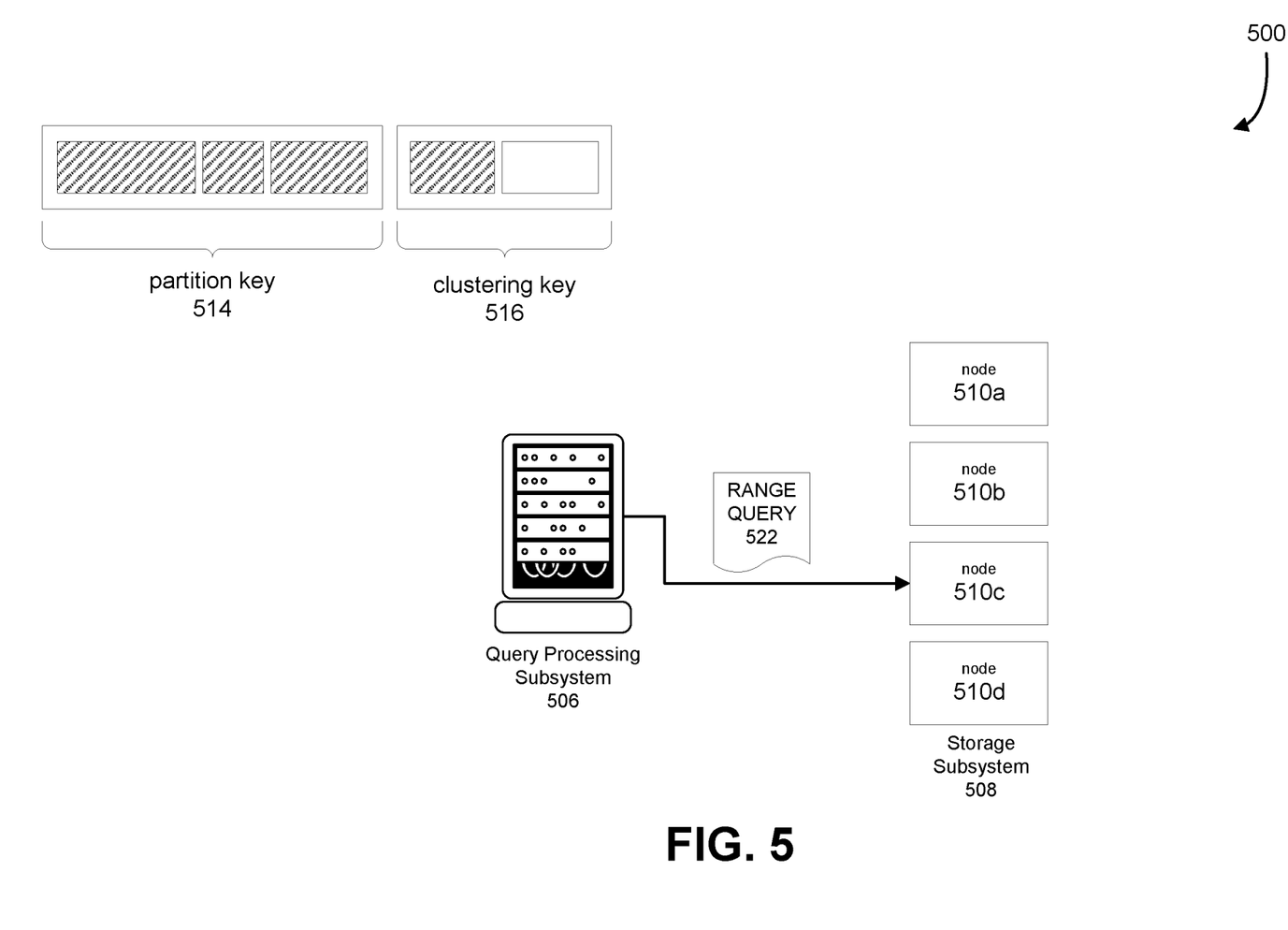
FIG. 5 illustrates an example of processing a table-oriented query using a RANGE QUERY operation, in accordance with at least one embodiment.

FIG. 5 illustrates an example 500 of processing a table-oriented query using a RANGE QUERY operation, in accordance with at least one embodiment. In at least one embodiment, a RANGE QUERY operation uses an index local to a storage node, based on fields of a clustering key specified by a query, to retrieve items corresponding to those rows which match the specified key portions.

For example, a row of a table t1 might be considered to have columns c1, c2, c3, c4, and c5, where the partition key 514 comprises columns c1, c2, and c3, and a clustering key to comprise columns c4 and c5. No complete primary key is indicated, and the clustering key is only partially specified. Note, however, that the leading portion, or prefix, of the clustering key 516 is specified. The leading portion, e.g. the leftmost portion in the illustrated example of FIG. 5, corresponds to the primary order by which data is sorted according to the clustering key 516. The next portion corresponds to the secondary sort order, and so forth.

In this example, the query processing subsystem 506 identifies a node 510c on which the subject row or rows is located, based on the fully specified clustering key 516. The query processing subsystem 506 then generates a RANGE QUERY operation, for performing on the identified node 510c, that is based on the partially specified clustering key. For example, if the query was SELECT*FROM t1 WHERE c1=v, c2=w, c3=x, AND c4=y, then the rows:

[v, w, x, y, a]
[v, w, x, y, b]
[v, w, x, y, c]

might be found on the node 510c by locating entries, in an index of the node 510c, that have c4=y. As indicated, in this example the column c4 is the leading portion of the clustering key 516. The RANGE QUERY operation therefore involves location of entries in a local index that correspond to the leading portion of a clustering key. Note that similar RANGE QUERY operations might be performed based on conditions other than equality, such as SELECT*FROM t1 WHERE c1=v, c2=w, c3=x, c4=y, AND c5>z. In such cases, however, the query processing subsystem does not treat the clustering key as fully specified, since a RANGE QUERY would be needed to locate records conforming to the condition c5>z.

In at least one embodiment, the RANGE QUERY is performed by the storage node 510c of the storage subsystem 508, and comprises a traversal of a local index comprising columns indicated by the clustering key.

In at least one embodiment, the storage node 510c maintains a collection of key-item pairs in an order indicated by the clustering key. A RANGE QUERY 522, in the at least one embodiment, comprises the storage node traversing the stored key-item pairs assisted by the ordering.

Figure 6:
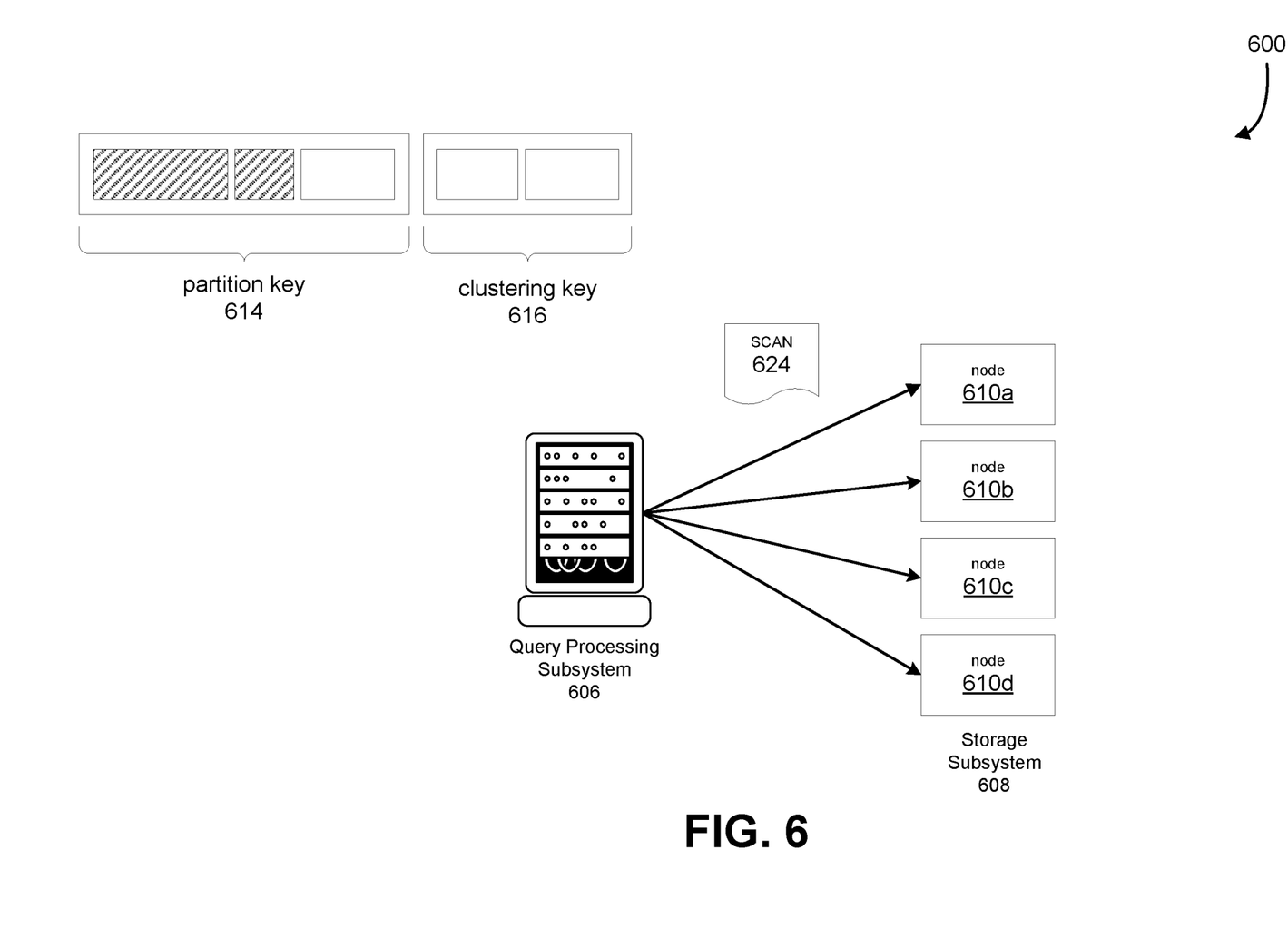
FIG. 6 illustrates an example of processing a table-oriented query using a SCAN operation, in accordance with at least one embodiment.

FIG. 6 illustrates an example of processing a table-oriented query using a SCAN operation, in accordance with at least one embodiment. For the purpose of the example 600 of FIG. 6, it may be presumed that the query did not fully specify either the partition key 614 or the clustering key 616. The query processing subsystem 606 determines that the partition key is not fully specified, and in response determines to involve each of the nodes 610a-d in the query. In at least one embodiment, had the clustering key been specified, the involvement of each of the nodes 610a-d might comprise the node's performing RANGE QUERY operations. However, in this example, the clustering key 616 is unspecified. The query processing subsystem 606 therefore instructs each of the nodes 610a-d of the storage subsystem 608 to perform a SCAN operation.

In at least one embodiment, a SCAN operation 624 on a storage node 610a-d comprises a complete inspection of all records that are associated with the subject table and stored on the respective storage node. Since no portion of the clustering key 616 is specified, the inspection is, in at least one embodiment, unaided by a local index.

Due to the involvement of multiple nodes, and due to the operation being unaided by a local index, a SCAN operation on a plurality of storage nodes may consume significant amounts of computing capacity, possibly including but not necessarily limited to consumption of central processing unit ("CPU") time, disk input/output capacity, or network bandwidth. In at least one embodiment, a permissions model for executing queries may incorporate control over SCAN operations. For example, a control plane, such as the control plane illustrated in FIG. 1, may maintain records to indicate whether the query processing subsystem 606 should be permitted to request that the storage nodes 610a-d perform SCAN operations.

Figure 7:
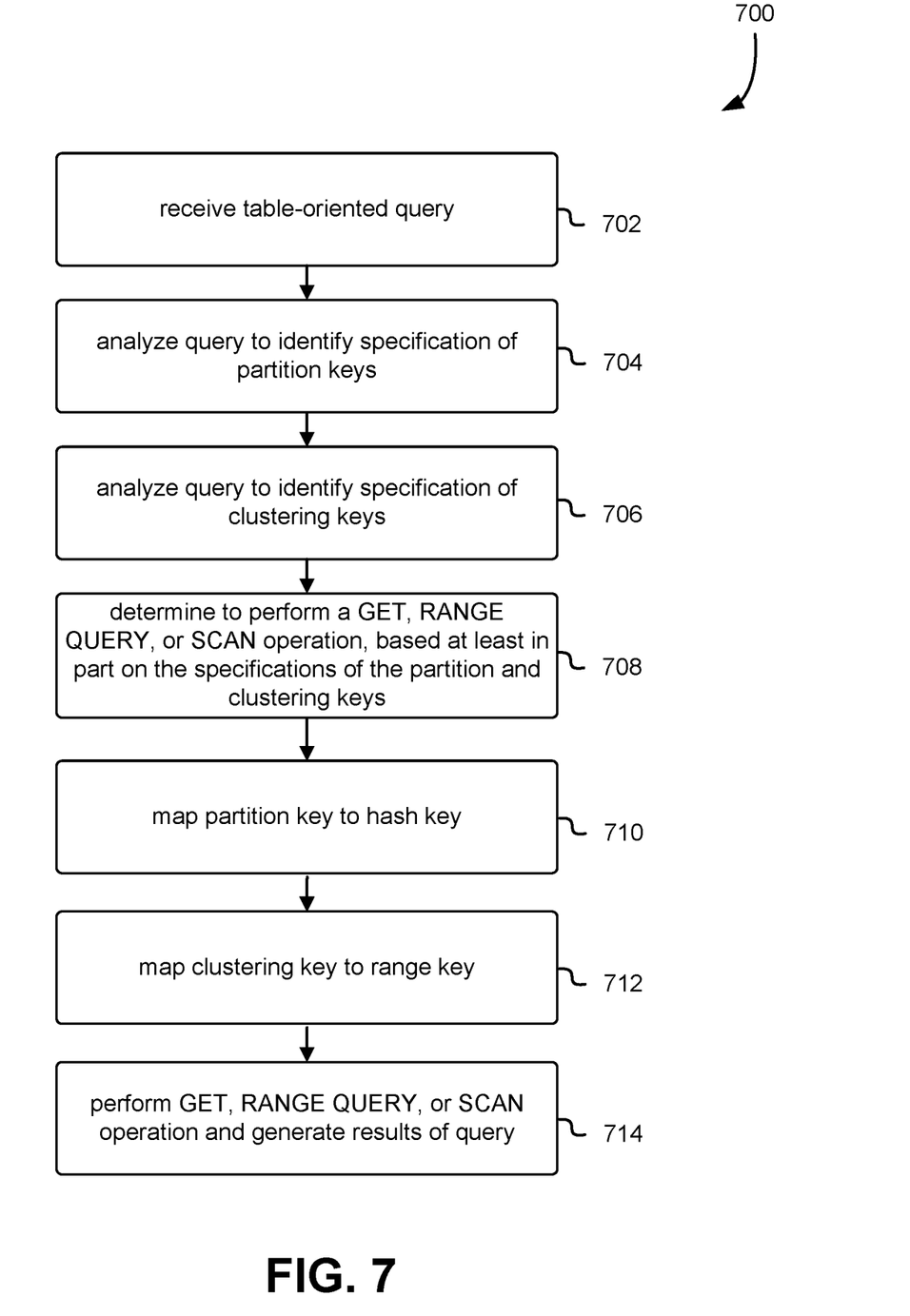
FIG. 7 illustrates an example process for executing a table-oriented query using a storage subsystem maintaining a collection of key-item pairs, in accordance with at least one embodiment

FIG. 7 illustrates an example process for executing a table-oriented query using a storage subsystem maintaining a collection of key-item pairs, in accordance with at least one embodiment. The example process 700 may be performed by any suitable computing system or combination of systems, including for example the distributed database depicted in FIG. 1 or one or more of the distributed databases depicted in FIG. 9. In at least one embodiment, the example process 700 is performed by a query processing subsystem, such as the query processing subsystem depicted in FIG. 1, running on such suitable computing system or combination of systems.

Although FIG. 7 is depicted as a series of steps or operations, the depicted sequence should not be viewed as limiting the scope of the present disclosure to only those embodiments that conform to the depicted sequence. For example, in various embodiments, the steps or operations depicted in FIG. 7 may be altered, reordered, or omitted, except where explicitly stated or where logically required, such as when an input to one step or operation is obtained from an output of another step or operation.

At 702, a table-oriented query is received. Here, table-oriented refers to the query referring to rows and columns. For example, a query might include a clause indicating a source table, a projection clause indicating what columns should be included in the results, and a filtering clause indicating which rows should be included in the results.

At 704, the query is analyzed to identify specification of a partition key. An example of this analysis is provided regarding FIG. 3. As noted, a partition key is fully specified when all portions of the partition key are definitively referenced in the query. If one or more portions of the partition key are not referenced, or are referenced with something other than equivalence, the partition key is not fully specified. A definitive reference includes specification by equality, e.g. c1=x, but not specification by comparison operators, such as c1>5, c1< >5, and so forth.

At 706, the query is analyzed to identify specification of a clustering key. An example of this analysis is provided regarding FIG. 3. Analysis of a clustering key may determine one of several condition. First, in some cases each portion of the clustering key is definitively referenced in the query, in which case the clustering key is fully specified. Second, in some cases only some portions of the clustering key are definitively referenced, but the portions include a contiguous prefix of the clustering key. The contiguous prefix is considered specified, but any noncontiguous portions are treated as not specified. Finally, the query may not specify any portions of the clustering key, or not specify any contiguous prefix portions.

At 708, a determination is made to perform at least one of a GET, RANGE QUERY, or SCAN operation, based at least in part on the specifications, if any, of partition and clustering keys.

For example, the query processing subsystem might determine to perform a GET operation when the query specifies fields corresponding to a primary key of a logical table, and these fields those needed to fully specify a partition key. In at least one embodiment, the fields needed for specifying the primary key correspond to those needed to specify all portions of the partition and clustering keys.

In another example, the query processing subsystem might determine to perform a RANGE QUERY operation when the query specifies fields corresponding to a contiguous prefix portion of the clustering key.

In another example, the query processing subsystem might determine to perform a SCAN operation when the query does not provide information sufficient for performing a GET or RANGE QUERY.

At 710, the specified partition key, if any, is mapped to a hash key. In at least one embodiment, the partition key corresponds to a logical partition, and the hash key corresponds to a particular storage node.

At 712, the specified clustering key, if any, is mapped to a range key.

At 714, the GET, RANGE QUERY, or SCAN operation is performed, and the results of the query are generated based on the data obtained as a result of performing the operation.

Figure 8:
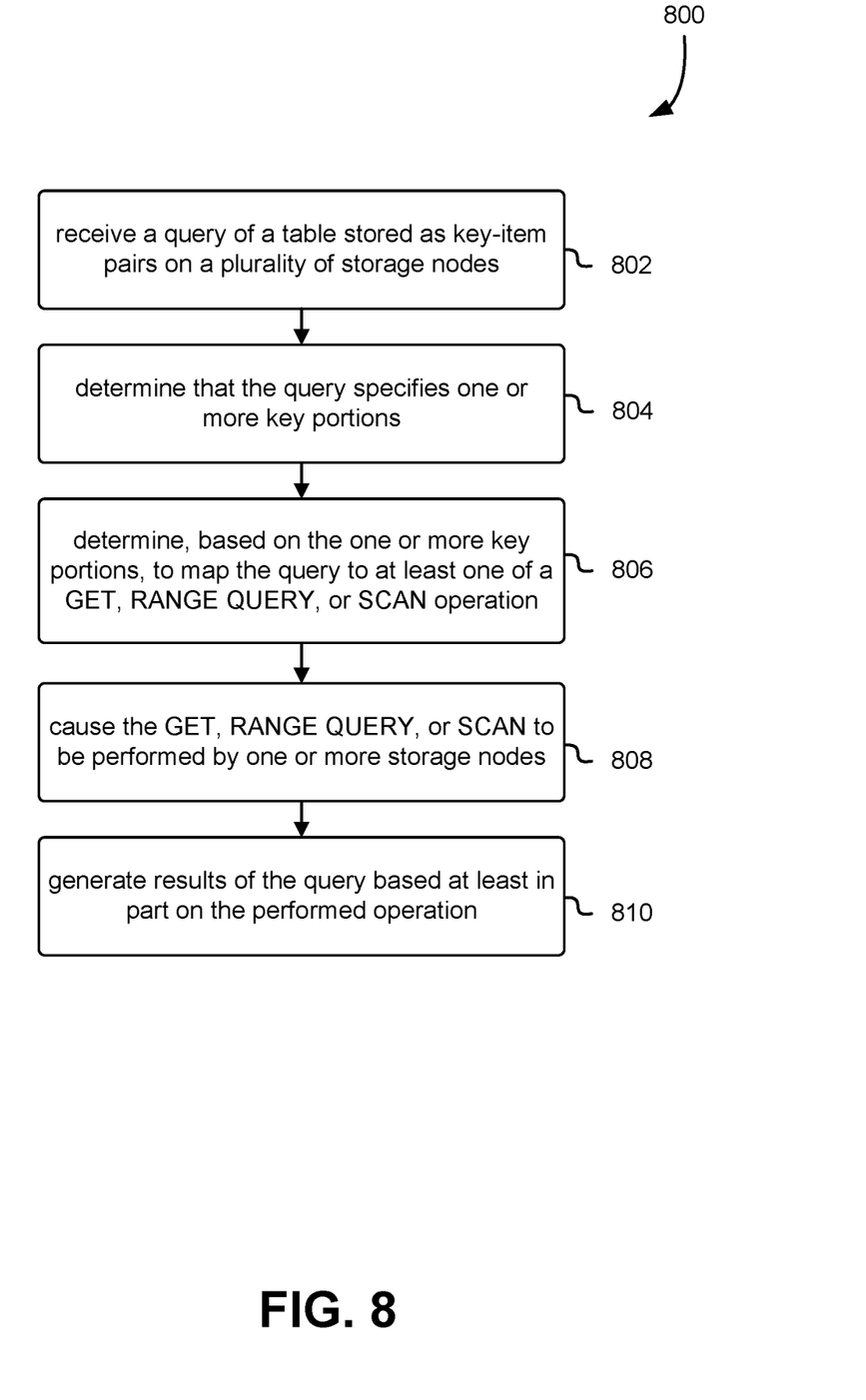
FIG. 8 illustrates an example process of processing a query in a distributed database system, in accordance with at least one embodiment.

FIG. 8 illustrates an example process of processing a query in a distributed database system, in accordance with at least one embodiment. The example process 800 may be performed by any suitable computing system or combination of systems, including for example the distributed database depicted in FIG. 1 or one or more of the distributed databases depicted in FIG. 9. In at least one embodiment, the example process 800 is performed by a query processing subsystem, such as the query processing subsystem depicted in FIG. 1, running on such suitable computing system or combination of systems.

Although FIG. 8 is depicted as a series of steps or operations, the depicted sequence should not be viewed as limiting the scope of the present disclosure to only those embodiments that conform to the depicted sequence. For example, in various embodiments, the steps or operations depicted in FIG. 8 may be altered, reordered, or omitted, except where explicitly stated or where logically required, such as when an input to one step or operation is obtained from an output of another step or operation.

At 802, a query processing subsystem receives a query of a table that is stored, as a collection of key-item pairs, by a storage subsystem that comprises a plurality of storage nodes. An item, or items, may be retrieved from the collection using GET, RANGE QUERY, and SCAN operations. The GET operation, in at least one embodiment, retrieves a specific item, from a specific storage node, based on a unique key. The unique key may be referred to as a primary key. In at least one embodiment, a primary key is a combination of fully specified partition and clustering keys. The RANGE QUERY operation, in at least one embodiment, retrieves a plurality of items, according to a filter criteria, based on traversal, inspection, or other operations on an index local to a particular storage node. The SCAN operation, in at least one embodiment, retrieves a plurality of items, according to a filter criteria, based on traversal, inspection, or other operations on the collection of data, unassisted by a local index. Further, a SCAN operation may also, in at least one embodiment, involve such operations on a plurality of storage nodes.

In at least one embodiment, a storage subsystem, such as those depicted in FIGS. 1 and 2, the storage nodes are nodes of a scalable, non-relational database system that is decoupled from the query processing subsystem. For example, the storage nodes may be components of a storage subsystem that scales independently from the query processing system. The query processing subsystem, in at least one embodiment, is an add-on service to the storage subsystem.

At 804, a query processing subsystem determines that a query specifies on or more key portions. FIG. 3 provides an example of identifying key portions specified in a query.

At 806, a query processing subsystem determines, based on the one or more key portions, to map the query to at least one of a GET, RANGE QUERY, or SCAN operation. Examples of these determinations are described with respect to FIGS. 4-6.

At 808, a query processing subsystem causes the determined GET, RANGE QUERY, or SCAN operation to be performed by one or more storage nodes. This may comprise sending a request to perform the operation to the storage subsystem, and receiving the resulting data. The processing of the GET, RANGE QUERY, and SCAN operations is described herein, for example with respect to FIGS. 4-6.

In at least one embodiment, the query processing subsystem determines to perform GET, RANGE QUERY, and SCAN operations in the course of translating a relational or table-oriented query, such as a query in SQL or CQL, to one or more GET, RANGE QUERY, and SCAN operations.

In at least one embodiment, a relational or table-oriented command to delete a row, or rows, of a logical table is translated to operations on a collection of key-item pairs maintained by the storage nodes of a storage subsystem. In at least one embodiment, the a command to delete a single row may be translated to a conditional expression that tests for the existence of a corresponding item and deletes the item if it exists. To perform this translation, a query processing subsystem may first determine that a complete primary key has been specified (e.g., both the partition and clustering keys are fully specified), and generate the conditional expression. For deletion of more than one item, a RANGE QUERY or SCAN may be performed to locate conforming rows, and a conditional delete expression executed for each row. Alternatively, in at least one embodiment, a combined range query and delete operation, or a combined scan and delete operation, is performed.

In at least one embodiment, a relational or table-oriented command to update a row, or rows, of a logical table is translated to operations on a collection of key-item pairs. These may be handled similarly to deletes, using conditional expressions to ensure that the item exists prior to performing the update, or using combined range query and update or scan and update operations.

In at least one embodiment, a relational or table-oriented command to insert a row, or rows, into a logical table is translated to operations on a collection of key-item pairs. A query processing subsystem may translate such commands into conditional expressions which ensure that the items to be inserted into the collection of key-item pairs does not exist prior to insertion.

In at least one embodiment, the data comprises an item or items retrieved from the storage subsystem, where each item comprises attribute-value pairs. For example, if the query is directed to a logical table comprising columns c1, c2, and c3, a retrieved item might comprise c1=x, c2=y, and c3=z, (where x, y, and z are the values of columns c1, c2, c3 for the retrieved row.

At 810, a query processing subsystem generates results of the query, based at least in part on the performed operation. This may comprise generating a data structure comprising a tabular representation of the retrieved data. In at least one embodiment, the data structure conforms to a database interaction protocol, such as a protocol that might be used to interact with a relational or table-oriented database.

Figure 9:
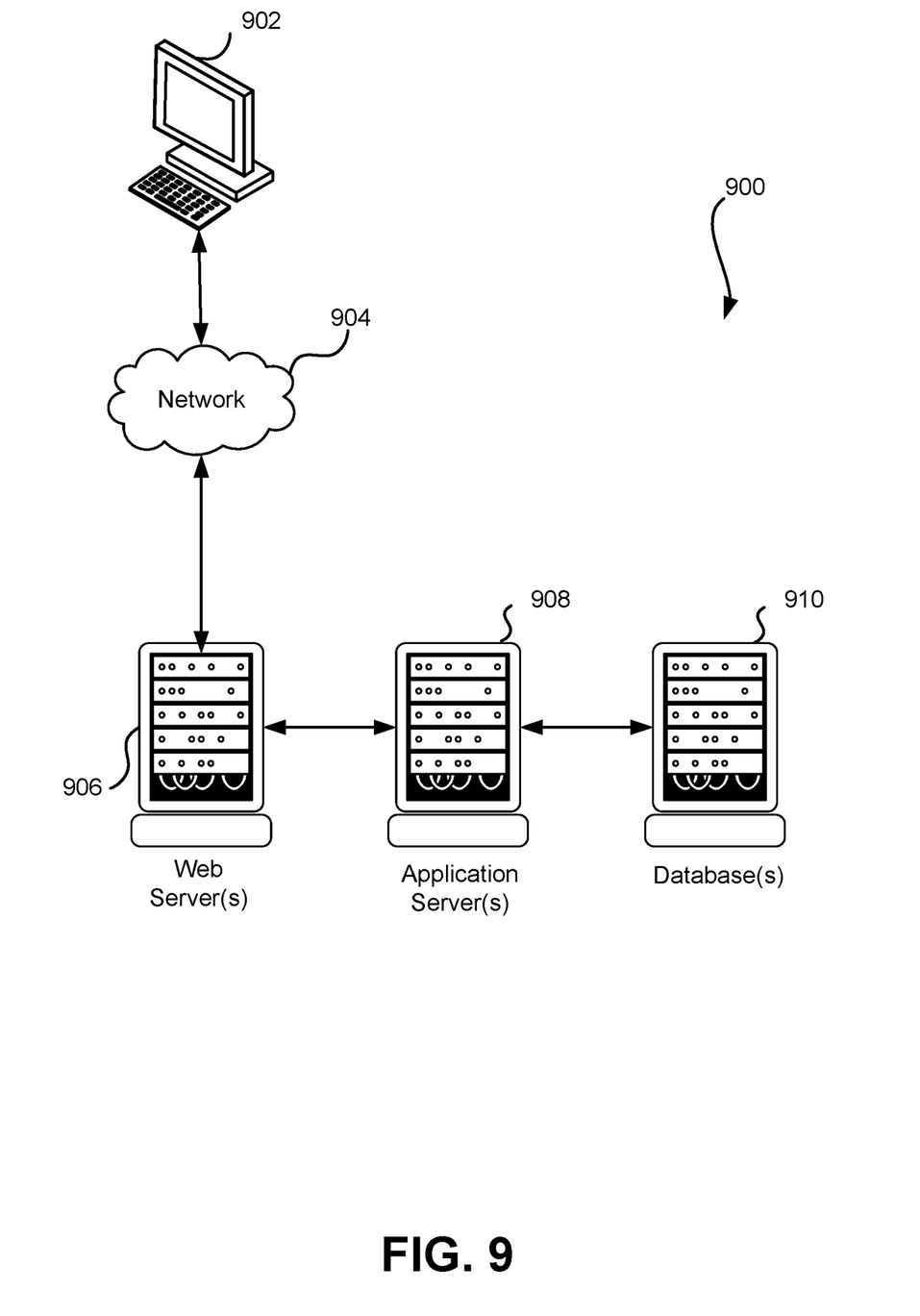
FIG. 9 illustrates an example of a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a database 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The database 910, in an embodiment, includes several separate data tables, databases, data documents, dynamic data storage schemes and/or other data storage mechanisms and media for storing data relating to a particular aspect of the present disclosure. The database 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions.

In an embodiment, a user, through a device operated by the user, submits a query for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
at least one processor; and
a memory comprising executable instructions that, in response to execution by the at least one processor, cause the system to at least:
  receive a query of a logical table, wherein data for the logical table is stored as a collection of key-item pairs, wherein a key-item pair of the collection of key-item pairs comprises an item and a key that maps to the item, the collection of key-item pairs collectively maintained by a plurality of storage nodes;
  determine that the query indicates one or more rows of the logical table, the one or more rows indicated by at least one or more key portions;
  translate the query, based at least in part on the one or more key portions, to at least one of a get, range query, or scan operation on one or more of the plurality of storage nodes; and
  generate results of the translated query based at least in part on data obtained by performing, on the one or more of the plurality of storage nodes, the at least one of the get, range query, or scan operation.

2. The system of claim 1, wherein the executable instructions, in response to execution by the at least one processor, cause the system to at least:
  determine to perform the get operation based at least in part on determining that the one or more key portions specify a partition key that can be mapped to precisely one of the storage nodes and that the one or more key portions uniquely specify an item of the collection of key-item pairs.

3. The system of claim 1, wherein the executable instructions, in response to execution by the at least one processor, cause the system to at least:
  determine to perform the range query operation based at least in part on determining that the one or more key portions specify a prefix of a clustering key.

4. The system of claim 1, wherein the executable instructions, in response to execution by the at least one processor, cause the system to at least:
  perform the scan operation based at least in part on determining that the one or more key portions do not map to precisely one of the storage nodes.

5. The system of claim 4, wherein the executable instructions, in response to execution by the at least one processor, cause the system to at least:
  determine whether processing of the query can be completed based at least in part on a record indicative of authority to perform the scan operation.

6. A computer-implemented method, comprising:
receiving a query of a logical table, wherein data for the logical table is stored as key-item pairs on a plurality of storage nodes, wherein a key of a key-item pair maps to an item of the key-item pair;
determining that the query specifies one or more key portions;
determining, based at least in part on the one or more key portions, to translate the query to at least one of a get, range query, or scan operation and cause one or more of the storage nodes to perform the translated query; and
generating results of the query based at least in part on the at least one of the get, range query, or scan operation.

7. The method of claim 6, further comprising:
determining whether the one or more key portions describe a partition key.

8. The method of claim 6, further comprising:
determining to perform the get operation when the one or more portions of the key map to one and only one of the plurality of storage nodes and the one or more key portions comprise a primary key.

9. The method of claim 6, further comprising:
determining to perform the range query operation when the one or more key portions specify a prefix of a clustering key.

10. The method of claim 9, further comprising:
performing the range query operation based at least in part on a local index of items stored on one of the plurality of storage nodes.

11. The method of claim 6, further comprising:
performing the scan operation when the one or more key portions do not specify a partition key that maps to one and only one of the plurality of storage nodes.

12. The method of claim 11, wherein the scan operation comprises examination, unaided by a local index, of items stored on two or more of the plurality of storage nodes.

13. The method of claim 6, further comprising:
translating a delete, insert, or update command in the query to a conditional expression.

14. A non-transitory computer-readable storage medium having stored thereon executable instructions that, in response to being executed by one or more processors of a computing device, cause the computing device to at least:
receive a query of a logical table, wherein data for the logical table is stored as a non-relational collection of key-item pairs on a plurality of storage nodes;
determine that the query comprises references to one or more portions of a key;
translate the query, based at least in part on the one or more portions of the key, to at least one of a get, range query, or scan operation on one or more of the plurality of storage nodes; and
generate results of the translated query based at least in part on items retrieved from the collection of key-item pairs by performing the at least one of the get, range query, or scan operation.

15. The non-transitory computer-readable storage medium of claim 14, having stored thereon further executable instructions that, in response to being executed by one or more processors, cause the computing device to at least:
determine to perform the get operation based at least in part on the one or more portions of the key mapping to one and only one of the plurality of storage nodes and the query fully specifying a primary key of an item.

16. The non-transitory computer-readable storage medium of claim 14, having stored thereon further executable instructions that, in response to being executed by one or more processors, cause the computing device to at least:
determine to perform the range query operation based at least in part on the one or more portions of the key comprising a prefix of a clustering key.

17. The non-transitory computer-readable storage medium of claim 14, having stored thereon further executable instructions that, in response to being executed by one or more processors, cause the computing device to at least:
determine to perform the scan operation based at least in part on the one or more portions of the key not specifying a complete partition key.

18. The non-transitory computer-readable storage medium of claim 14, having stored thereon further executable instructions that, in response to being executed by one or more processors, cause the computing device to at least:
determine to perform the scan operation based at least in part on the query indicating disjoint portions of a clustering key.

19. The non-transitory computer-readable storage medium of claim 14, having stored thereon further executable instructions that, in response to being executed by one or more processors, cause the computing device to at least:
determine to continue processing of the query based at least in part on a record indicative of authorization to perform the scan operation.

20. The non-transitory computer-readable storage medium of claim 14, wherein a row of the logical table is stored as an item in the collection of key-item pairs.

* * * * *